May 16, 1933. R. J. S. PIGOTT 1,909,117
GEAR TOOTH SHAPE
Filed April 21, 1932 3 Sheets-Sheet 2

INVENTOR
R. J. S. Pigott

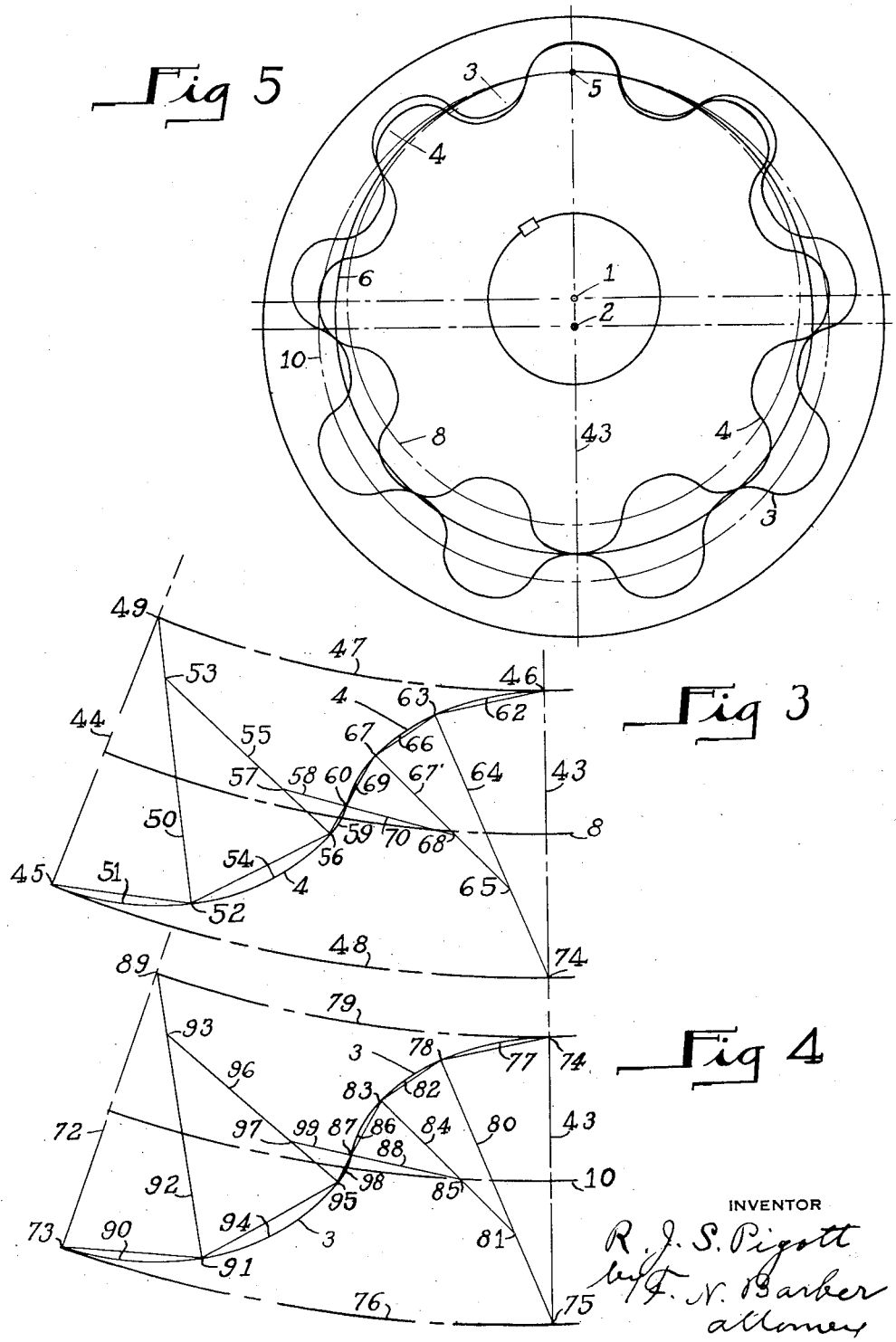

Patented May 16, 1933

1,909,117

UNITED STATES PATENT OFFICE

REGINALD J. S. PIGOTT, OF PITTSBURGH, PENNSYLVANIA, ASSIGNOR TO P. L. CORPORATION, OF BRIDGEPORT, CONNECTICUT, A CORPORATION OF CONNECTICUT

GEAR TOOTH SHAPE

Application filed April 21, 1932. Serial No. 606,567.

This invention relates to gear tooth shapes and more specifically to internal-external gear combinations having relatively few teeth, the number of teeth on the internal or ring gear exceeding the number on the external or pinion gear by one.

One object of this invention is to provide a rotor combination consisting of a pinion and a ring gear differing by one in number of teeth, for use in hydraulic pumps and motors or in compressors or motors using compressible fluids, the gear teeth having a line of action greater than one tooth space in order that a combination having few teeth may operate continuously, smoothly, and with a uniform angular velocity relation.

Another object is to provide tooth action with as little relative sliding as possible, and to provide several simultaneous tooth contacts to distribute and reduce driving pressures.

A further object is to provide a working gear shape that will drive with correct velocity ratio whether the relative center locations of the gears are precise or not.

A further object is to provide a smooth continuous action such that gears of very few teeth, less than 10, may be operated at high rotative speed without noise and with minimum wear.

A further object is to provide a tooth shape such that when in use inevitable wear does take place the gear shape for driving will not be materially altered, and when used as a pump or a motor leakage will not be materially affected.

Many forms of gear teeth for motors and pumps have been proposed, some of which have been commercially developed. All of these known to me have been based upon the two well known basic families of gear curves, namely, the involute, having a straight line of action, and the cycloid, having a circular line of action.

At least two conditions must be satisfied to permit gears belonging to such families to operate. The line of action must be continuous for at least one tooth space, and the teeth must not interfere in the region where they disengage or approach out-of-mesh position. The involute shapes of all angles of attack up to 40° fail because the line of action is straight and quickly extends beyond the limits of the teeth. Moreover, the working face of the teeth must be considerably less than the tooth depth, as the teeth must be rounded at the tip to avoid interference. Involute curves have been employed for gear combinations where the ring gear differs from the pinion by two teeth or more and where the pinion has no less than seven teeth.

The cycloidal gear proper has one form which will drive without interference, namely, one in which the diameter of the describing circles for the epicycloids of the tooth faces and the hypocycloids of the tooth flanks is equal to the eccentricity of the two gear centers and at the same time to one-half the tooth height. The difficulty with the cycloidal shape in this combination, as in all cycloidal forms, is that the center distances or eccentricity of the gears must be extremely precise. This difficulty is most pronounced in internal-external combinations of few teeth so that the least variation in center distances causes failure of the gears to operate properly.

The pin-type tooth which is a modification of the cycloidal form has been proposed, but fails in commercial development for the same reason, besides, it has a very undesirable action for durability.

The gear shape which is the subject of this invention combines the long line of action of the cycloidal forms with the insensibility to exact eccentricity which is an advantage of the involute form. It is to be noted that the principal line of action in the case of the internal-external gears differing by one tooth is not the primary line of action upon which most commercial external gears operate, but the secondary line of action which only appears in the case of internal-external combinations, especially those of few teeth.

The cycloidal forms are all rolled shapes, that is, they are produced by rolling closed figures, such as circles, upon the pitch circles. Consequently, the tooth shape or flank must always cross the pitch circle perpendicularly thereto. This is one of the reasons why they cannot function correctly when the center distance is not exact. This disadvantage has always been noticeable with all forms of cycloidal gears and is the principal reason why they have largely been displaced by the involute form.

The curves of the basic rack of the tooth form discovered in the present invention are a pair of logarithmic spirals, which have not hitherto to my knowledge been applied to gears. It is well known in the art that an infinite number of curves can be used for successful gear action in ordinary external gears and that they can be made to produce uniform driving action, which is a desideratum. But the mechanical limits imposed by the combination of the internal-external gears with relatively few teeth, for example, not exceeding 10, prevent the use of nearly all curves for such gears. They fail either by interference or by too short a line of action for continuity of drive.

Referring to the accompanying drawings, Fig. 1 is a diagrammatic representation showing numerous relative positions of one-half of a tooth of a pinion-gear mating with the corresponding half of a tooth of a ring gear, both embodying the tooth shapes to which this invention relates.

Fig. 3 is a diagrammatic representation of the contour of half of an eight-tooth pinion designed to mate with a nine-tooth ring gear, the tooth being developed from the basic rack form of Fig. 2 and the tooth space being regarded as at the right of the curve 4.

Fig. 4 is a diagrammatic representation of the contour of half a tooth of a ring gear designed to mate with a tooth made in accordance with Fig. 3, the tooth being also developed from the basic rack form of Fig. 2, and the tooth space being regarded as at the left of the curve 3.

Fig. 5 is a view of an eight-tooth pinion mating with a nine-tooth ring gear.

Figure 1:
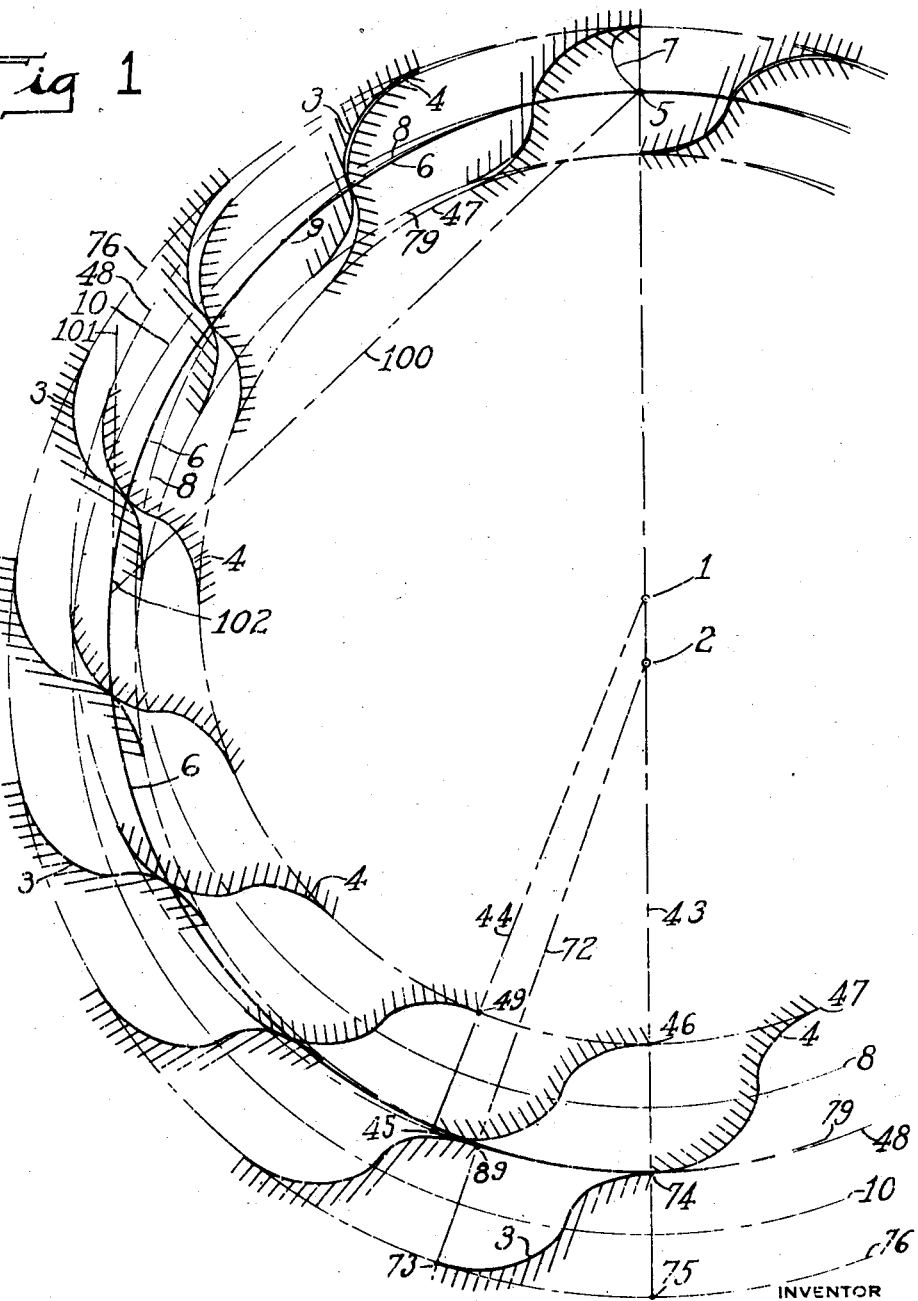

Referring first to Fig. 1, 1 designates the center of the pinion and 2 the center of the ring gear. There are two sets of curves 3 and 4, the outer set representing the shape or form of half of a ring gear tooth, and the inner set of curves 4, the shape and form of a mating half of a pinion gear tooth. The pairs of contacting curves 3 and 4 represent not different pairs of teeth, but the two facing or opposing relative positions of the driving and driven outlines or contours of the same teeth 3 and 4 for about 180° rotation of the gears, the pinion doing the driving and rotating anticlockwise.

In accordance with current and established representation, the curves are accompanied by hatching to show at which side of the teeth the solid parts thereof are assumed to lie.

The pitch point 5 is shown at the top of Fig. 1 on the secondary line of action 6 which is the locus of the contacting points in the two curves 3 and 4 for all positions of the teeth in their rotation about their centers 1 and 2. The primary line of action indicated by the curved line 7 upon which most commercial external gears operate, is not of particular importance to the present invention. In the present invention the secondary line of action 6 is the important one. It begins at the pitch point 5 and passes to the left slightly inside of the pitch circle 8 of the pinion, or on the pitch circle by slightly altering the shape of the tooth curve, to about seven-eighths of one tooth space, or to about the point 9 and thereafter it is located between the pitch circle 8 of the pinion and the pitch circle 10 of the ring gear, gradually approaching the mid point between these circles, which point is reached at the bottom of Fig. 1 at the point 74, 180° from the pitch point 5, where the gears are fully out of mesh and the line of action corresponds to the tops of the teeth of both gears. The primary line of action is represented by the curved line 7 which passes through the pitch point 5 at a slight angle outside of the pitch circles of the gears, describing a cardioid-shaped figure similar to one lobe of the Lemniscate of Bernouilli and is tangent to the circles enveloping the tops of the pinion teeth 4, and the bottoms of the ring gear teeth 3. The primary line of action is of small lateral width, not exceeding one-fourth of a tooth space, and therefore is insufficient to provide the necessary arc of action required for successful driving.

While the curve of the tooth shape could be expressed in algebraic terms, the expression is too complex for practical use and the shape can be more conveniently defined geometrically. As is well known in the art, all commercial gear shapes, involute, cycloidal and others, are reduced to a series of approximate circular arcs for convenience in making or duplicating the cutters with the necessary precision. My gear shape can be easily shown defined for commercial reproduction. The usual procedure is to define the basic rack tooth form from which the gear may be generated by hobbing or otherwise. The rack tooth form of the involute is straight flanked, the flanks being inclined to the pitch line and perpendicular to the line of action which is also a straight line. The rack tooth form for the present invention will now be described.

Figure 2:
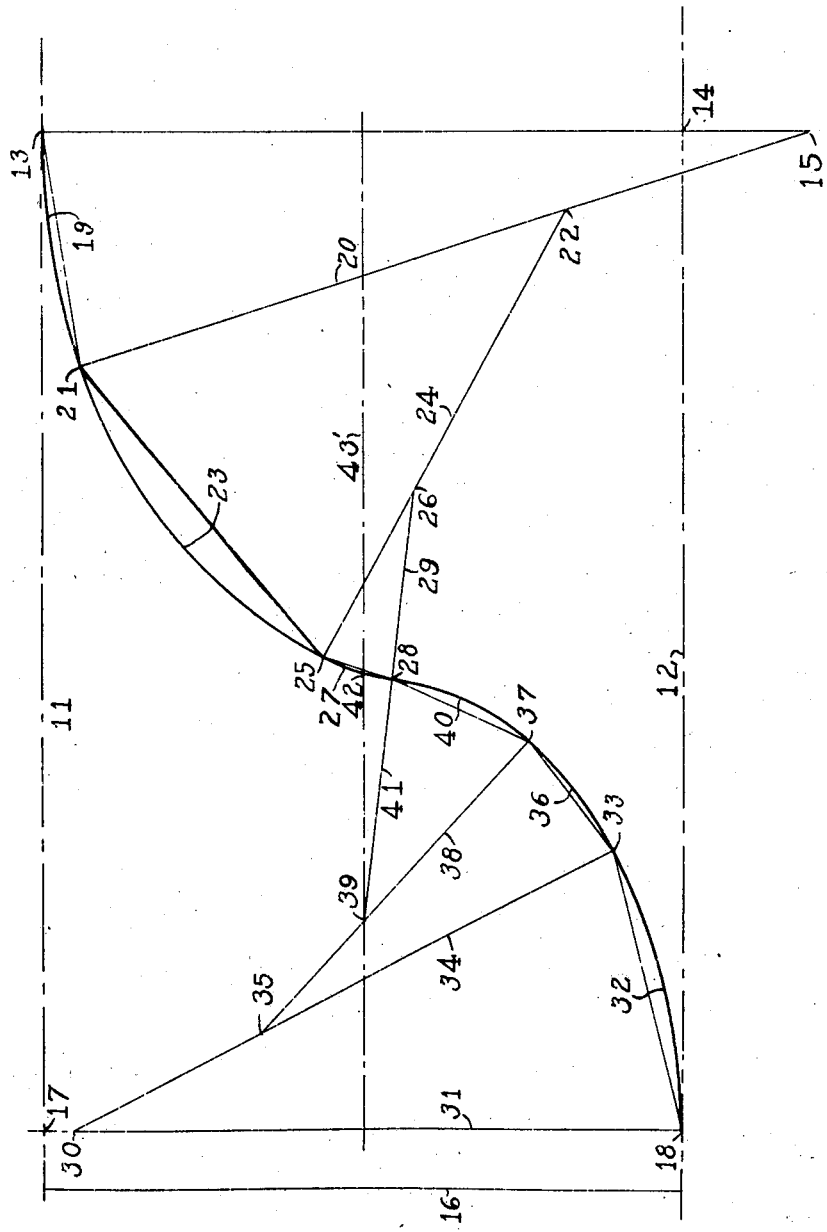
Fig. 2 is a diagrammatic representation of the contour of a half tooth of the basic tooth rack form for the present invention, the view showing the right half of a tooth form.

Fig. 2 shows the method of laying out a basic tooth rack for the length of half a tooth, the remainder of the rack being readily completed by those acquainted with the art to which this invention relates. Draw the parallel lines 11 and 12 tangent to the bottom and top of a gear tooth. At the right end of the tooth space draw the center line 13—14 of the tooth space at right angles to the lines 11 and 12 and extend the line to the point 15 below the line 12. The length of the line 13—14 and the line 16 represents the tooth height while the line 13—17 or the line 14—18 represents half of the tooth length. From the point 15 and with the radius 13—15 draw to the left the arc 19 from the point 13 and at the final end 21 of the arc draw the radius 20. From the point 22 on the radius 20 draw the arc 23 from the point 21 to the point 25 and draw the radius 24 from the point 22 to the point 25. From the point 26 on the radius 24 draw the arc 27 from the point 25 to the point 28 and draw the radius 29 between the points 26 and 28. This completes the left half of the concave flank of the rack tooth.

Beginning now at the point 30 in the center line 17—18 draw therefrom with the radius 31 the arc 32 to the right from the point 18 to the point 33. Draw the radius 34 between the points 30 and 33. From the point 35 on the radius 34 draw the arc 36 from the point 33 to the point 37 and draw the radius 38 between the points 35 and 37. From the point 39 as a center on the radius 38 draw the arc 40 from the point 37 to the aforesaid point 28 and draw the radius 41 between the points 39 and 28. It will be found that the two radii 29 and 41 are continuations of each other. This completes the concave face of the rack tooth. 42 is the point where the pitch line 43' intersects the resultant curve or contour of the tooth. The dimensions of certain of the various lines and chords of the said arcs are set forth in the following table, the tooth height indicated by the line 16, or the line 13—14 or the line 17—18 being unity.

| | |
|---|---|
| Line 16 | 1.000 |
| Radius 20 | 1.200 |
| Chord of arc 19 | .378 |
| Radius 24 | .800 |
| Chord of arc 23 | .594 |
| Radius 29 | .300 |
| Chord of arc 27 | .108 |
| Radius 34 | .952 |
| Chord of arc 32 | .454 |
| Radius 38 | .620 |
| Chord of arc 36 | .230 |
| Radius 41 | .380 |
| Chord of arc 40 | .216 |
| Line 14—15 | .200 |
| Line 17—30 | .048 |
| Line 13—17 | 1.5708 |

The shape of the basic rack indicated by the tandem series of arcs through the points 19, 23, 27, 40, 36, and 32 being thus determined, internal or external gears of any number of teeth may be generated by any of the usual methods, such as shaping or hobbing and they will properly mate with each other.

Fig. 3 shows how half of a gear tooth of an eight-tooth pinion for a nine-tooth ring gear may be laid out or generated from the basic rack just described. The tooth contour is closely approximated as follows: Fig. 3 may be regarded as corresponding to the contour of half a tooth 4 lying between the center line 43 which includes the centers 1 and 2 and the line 44 drawn from the center 1 to the center of the top of the said pinion tooth 4, the center of the top of the tooth being indicated at 45 and the center of the bottom of the tooth being indicated at 46. 47 and 48 are circles tangent to the bottoms and tops of the teeth of the pinion, respectively.

To draw the tooth contour for half of a pinion tooth suitable for an eight-tooth pinion, start on the center line 44 at the point 49 where it intersects the circle 47, and with the radius 50 draw the arc 51 toward the right from the point 45 to the point 52. Draw the radius 50 between the points 49 and 52. From the point 53 on the radius 50 draw the arc 54 from the point 52 to the point 56 and draw the radius 55 between the points 53 and 56. From the point 57 on the radius 55 draw the arc 59 from the point 56 to the point 60 and draw the radius 58 between the points 57 and 60.

Also from the point 74 on the center line 43 where it intersects the circle 48 draw the arc 62 to the left from the point 46 to the point 63. Draw the radius 64 between the points 63 and 74. From the point 65 on the radius 64 draw the arc 66 from the point 63 to the point 67 and draw the radius 67' between the points 65 and 67. From the point 68 on the radius 67' draw the arc 69 from the point 67 to the said point 60 and draw the radius 70 between the points 66 and 68. The contour of the half-tooth in Fig. 3 is the tandem arcs through the points 45, 52, 56, 60, 67, 63, and 46. It will be found that the radii 58 and 70 will be in a straight line.

The tooth height equalling the line 46—47 being referred to as unity, dimensions on Fig. 3 are as follows:—

| | |
|---|---|
| Points 45 to 49 | 1.000 |
| 46 to circle 48 | 1.000 |
| Chord of arc 51 | .488 |
| Radius 55 | .790 |
| Chord of arc 54 | .546 |
| Radius 58 | .224 |
| Chord of arc 59 | .12 |
| Radius 64 | 1.000 |
| Chord of arc 62 | .392 |
| Radius 67' | .662 |
| Chord of arc 66 | .250 |
| Radius 70 | .386 |
| Chord of arc 69 | .210 |
| Pitch line from line 43 to line 44 | 1.5708 |

Fig. 4 shows how to draw the contour of half of a tooth of the ring pinion corresponding to the half of the pinion tooth shown in Fig. 3. The contour of half a tooth of the ring gear may be considered that shown at 3 between the center line 43 and the center line 72, drawn from the center 2 on Fig. 1 to the point 73 at the left hand end of the bottom of the said tooth 3. The right hand end of the half tooth 3 is designated at 74.

The half tooth shown on Fig. 4 may be laid out as follows, the tooth height 74—75 or 73—89 being unity: From the point 75 at the intersection of the center line 43 with the circumscribed circle 76 tangent to the bottoms of the ring gear teeth, draw the arc 77 from the point 74 to the point 78, the point 74 being in the circle 79 which is tangent to the tops of the teeth. Draw the radius 80 between the points 75 and 79. From the point 81 on the radius 80 draw the arc 82 from the point 78 to the point 83 and draw the radius 84 between the points 81 and 83. From the point 85 on the radius 84 draw the arc 86 from the point 83 to the point 87 and draw the radius 88 between the points 85 and 87.

From the point 89 which is at the intersection of the center line 72 with the circle 79 which is the inscribed circle tangent to the tops of the ring gear teeth, draw the arc 90 from the point 73 to the point 91, the point 73 being at the intersection of the center line 72 with the circle 76. Draw the radius 92 between the points 89 and 91. From the point 93 on the radius 92 draw the arc 94 from the point 91 to the point 95 and draw the radius 96 between the points 93 and 95. From the point 97 on the radius 96 draw the arc 98 from the point 95 to the said point 87 and draw the radius 99 between the points 87 and 97. It will be found that the two radii 88 and 99 are in a straight line. The contour of the half-tooth in Fig. 4 comprises the tandem arcs through the points 74, 78, 83, 87, 95, 91, and 73.

The dimensions of the parts referred to in Fig. 4 are as follows:—

| | |
|---|---|
| Radius 72 | 1.000 |
| Chord of arc 90 | .488 |
| Radius 96 | .790 |
| Chord of arc 94 | .540 |
| Radius 99 | .224 |
| Chord of arc 98 | .12 |
| Radius 80 | 1.000 |
| Chord of arc 77 | .390 |
| Radius 84 | .662 |
| Chord of arc 82 | .250 |
| Radius 88 | .386 |
| Chord of arc 86 | .220 |
| Pitch line 100 between the center lines 43 and 72 | 1.5708 |

The angle of attack or of pressure is maintained at less than 46° to the tangent to the line of action 6 for an arc of approximately 90° of rotation. On Fig. 1, 100 designates a chord of the pitch circle drawn from the pitch point 5 to a point on the line of action at approximately an arc of 90° of rotation from the pitch point. The tangent at this point is marked 101 and the angle between the tangent and the chord is marked 102 and is the angle of attack or pressure just referred to. The distance from the pitch point 5 to the tangent point is equal to one tooth space for a pinion of four teeth, the minimum that can be satisfactorily employed commercially for a self-driving gear combination. For any greater number of teeth this arc is greater than one tooth space, and for a pinion of eight teeth it is equal to two tooth spaces.

I claim:—

1. For a gear tooth system, a basic rack, the profiles of which are formed of portions of two logarithmic spirals.

2. For a gear tooth system, a basic rack, the profiles of which are formed of two logarithmic spirals, the profiles crossing the pitch line at less than a right angle.

3. For a gear tooth system, a basic rack the profiles of which are approximated to two logarithmic spirals by six tandem circular arcs located substantially as described and illustrated.

4. A mating pinion and an internal gear, the latter having one more tooth than the pinion, the teeth of the pinion being generated from a basic rack formed of two logarithmic spirals.

5. Mating external-internal gears generated from a basic rack formed of two logarithmic spirals.

6. A mating pinion and an internal gear having respectively eight and nine teeth, the profiles of which are approximated to two logarithmic spirals by tandem circular arcs substantially as described and illustrated.

7. The combination of a mating pinion and an internal gear, the latter having one more tooth than the pinion, in which combination the angle of the attack does not exceed 46° at 90° of rotation of the pinion from its full-depth mesh with the internal gear, and in which more than one tooth is simultaneously driving, and in which the line of action starting at the pitch point lies on or slightly within the pitch circle of the pinion up to substantially one tooth space from the pitch point and thereafter lies between the pitch circles of the pinion and the ring gear.

8. A mating pinion and a ring gear generated from a basic rack formed of two logarithmic spirals and maintaining a constant angular velocity relation irrespective of clearances at the tops and bottoms of the teeth.

9. The combination of a mating pinion and a ring gear generated from a basic rack formed of two logarithmic spirals, in which combination the velocity ratio and the driving action is constant when the center distances between the pinion and the gear are changed by small amounts from the theoretical relative positions of the centers.

In testimony whereof, I hereunto affix my signature.

REGINALD J. S. PIGOTT.